Figure 1:
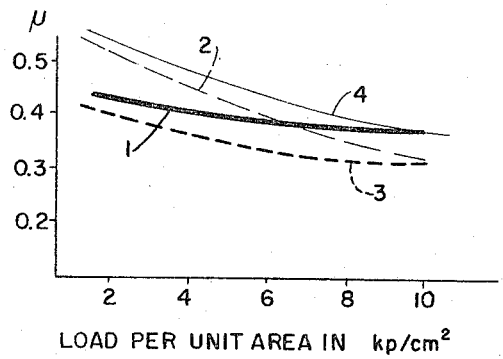

INVENTORS
Josef Schlömer &
Günter Gerloff
BY Spencer & Kaye
ATTORNEYS

United States Patent Office 3,306,715
Patented Feb. 28, 1967

3,306,715
FRICTION MATERIAL COMPOSITION
Josef Schlömer, Kuchen, and Günter Gerloff, Reinbek, Germany, assignors to Jurid Werke G.m.b.H., Reinbek, Germany
Filed July 7, 1965, Ser. No. 470,178
Claims priority, application Germany, July 9, 1964, J 26,180
4 Claims. (Cl. 29—182.5)

The present invention relates to a sintered type friction material suitable for brake and clutch linings and similar applications.

More particularly, the invention concerns a sintered type friction material having a matrix composed principally of ferrous metal having distributed therein selected metals, metal compounds, and lubricants, the ferrous metal forming a continuous phase.

In accordance with the present invention, there is provided an improved ferrous metal friction material wherein the coefficient of friction is stabilized over a wide range even under the impact of extreme thermal loads, high sliding speeds and high surface pressure. Moreover, the friction material of the invention is capable of being easily manufactured, without the use of a high temperature furnace.

In known friction materials having a metal base, it has been customary to employ sintered lead bronzes with additions of dry lubricants, together with so-called friction supporters. Graphite and molybdenum disulfide have proved particularly well suited for dry lubricants, in conjunction with ceramic and mineral additives for increasing the coefficient of friction. The precise composition of the friction materials differ widely and are determined by their subsequent applications.

For a considerable time, efforts have been made to produce sintered friction materials having an iron base, the incentive being the relatively low cost of the iron powders used, as well as other favorable friction characteristics. In general, ferrous friction materials exhibit a considerably lower thermal fading (decrease of coefficient of friction with increase in temperature) than do friction materials having a bronze or copper base.

Many efforts have been made in the prior art to replace copper or copper-zinc base materials by iron, and these have been influenced by monetary as well as technical consideration. Iron, owing to its melting point which lies about 500° C. above that of copper, exhibits a higher thermal stability. The thermal fading of a sintered iron friction material is therefore very small. It is thus surprising that sintered ferrous materials are seldom employed in industrial practice.

Two possible reasons for this limited use are that they possess a strong tendency toward seizing, and the difficulties in fabrication of the material.

The behavior of a friction couple of iron against iron (steel against steel) is well known to those skilled in the art. Without the inclusion of a solid or liquid lubricant, seizing and destruction of the material occurs. Accordingly, in a sintered friction material having a ferrous metal base, considerable dry lubricant material must be present to forestall this phenomenon with certainty. As a rule, additions of graphite (graphite powder) in amounts up to about 20% by weight or 50–60% by volume are necessary. However, with so high a proportion of nonmetallic components in the friction composition mixture, the strength of the sintered composition drops sharply, so that a tearing strength of 1.0 kg./mm.² and less is to be expected. The erosion of the composition will thus exceed the technically permissible limits. On the other hand, the friction coefficient is so reduced by the presence of large amounts of graphite that the industrial value of the material is lost. Moreover, the processing of such material is difficult and uneconomical. The addition of large amounts of so-called friction supporting material can restore the coefficient of friction to a practical level. These friction raising additions include ceramic and/or mineral materials which are completely inert toward the sintering of the metal matrix and do not contribute to its internal strength. Actually, they statistically decrease the number of metallic bonds between individual metal particles. The friction supporting materials thus tend to produce a still higher erosion that that attributable to the graphite additions.

Efforts have also been made to raise the internal strength of the mass by means of alloying elements. There may be employed for this purpose the incorporation of finely divided copper powder, up to 20% by weight, or else the immersion of the finished sintered composition in molten copper or bronze or other metals which are soft or which have a low melting point. The results have not been satisfactory, however.

Still another way to increase strength consists in sintering the friction material to a porous condition and finally saturating it and hardening it with a resin solution, or else by preparing a coarse granular product from the sinter mixture and bonding this with resin. To produce sufficient strength, amounts of resin up to about 20% by weight are needed. Because of the low specific gravity of the synthetic resins (about 1.2 g. per cm.³), the proportion by volume is from 2 to 3 times as high. Moreover, the characteristic properties of sintered iron materials are lost through the admixture of such large amounts of organic binders.

The substitution of molybdenum disulfide for graphite produces an improvement. The $MoS_2$ exerts a highly effective dry lubricant action, and it is theoretically possible to achieve the same lubricant effect as with graphite with smaller additions of $MoS_2$. In practice, however, this is not borne out, and the erosion is higher than with comparable amounts of graphite in the case of iron base friction materials. This may be attributed in part to decomposition of $MoS_2$ on sintering.

There is also known a process which depends upon formation of an auxiliary lubricant of FeS or $Fe_2OS_2$ in the sintered iron friction material. The low heat stability of sulfur compounds together with the strong dependence of the coefficient of friction upon temperature, renders this process impractical.

The strength of a mixture of metal powders on one hand, and of nonmetal powders on the other, is primarily dependent upon the grain size of the powders involved. In like manner, the friction behavior of the friction material is determined by the particle size of the powders employed. Customarily, powders having a particle size of 0.3 mm. down to 0.010 mm. are used. The finer the graphite, the finer must be the iron powder to produce the necessary strength.

In accordance with the present invention, there is provided as a friction material a sintered ferrous base composition including as the essential ingredients from about:

| | Percent by weight |
|---|---|
| Iron powder | 40–60 |
| Copper or copper alloy powder | 25–35 |
| Metal phosphides and/or sulfides | 1–5 |
| Aluminum silicates | 3–10 |
| Metalloid carbides and/or metal carbides | 1–5 |
| Dry lubricants | 5–10 |
| Soldering metals and/or alloys having a melting point between 100° and 500° C. | 2–6 |

The coefficient of friction of the friction materials of the invention lies between about 0.2 and 0.3 and the wear is comparable with that of materials having a copper base. The metallic friction ingredients must be sintered upon a carrier. Conventional sintering furnaces, employing pressure have heretofore been adapted only to temperatures up to 900° C. and cause difficulties at higher temperatures. The friction material compositions of the present invention have the advantage of being sinterable at temperatures between about 700° C. and about 900° C. and thus can be prepared in conventional sintering furnaces. This is accomplished, in accordance with the invention, by including metals such as tin or metal compounds such as metal sulfides having a low melting point rendering possible sintering in a liquid phase at temperatures where such liquid phase occurs. Thus, the sintering temperature can be kept within predetermined limits, with due regard to the maintenance of the frictional requirements.

In accordance with the invention, it has been found that a considerable increase in strength of the sintered ferrous metal mixtures can be obtained by the inclusion of from about 5 to about 20% by weight of copper or bronze, either by addition in powder form, or by saturating the iron skeleton previously sintered. However, this alone is not enough, as the wear of such mixtures is still too great and the coefficient of friction is too variable. An improvement in these properties can be produced by the further inclusion of lubricants and friction supporting materials.

The usual ceramic or mineral friction supporting ingredients display their full efficacy only in relatively high proportions in the friction materials mixture. Thus, it has been suggested to employ silicon carbide (Carborundum) as a friction supporter. Owing to the great hardness of carbides a very large increase in the coefficient of friction is produced with only small additions (about 5 to 15%). This shifts the wear to other ingredients, which is also undesirable.

The novel mixtures of the invention provide a considerable improvement of frictional physical properties, an increased coefficient of friction, resistance to wear, and avoidance of thermal fading, thereby overcoming the disadvantages of previously known iron base friction compositions.

The ferrous metal ingredient can be iron powder having a particle size not in excess of about 0.3 mm.

The copper or bronze component is also a powder having a particle size not in excess of about 0.3 mm.

There are also included in the composition of the invention metal sulfides, such as copper, iron and nickel sulfides. These ingredients perform the function of providing friction supporting materials. The amount employed should not exceed about 5% by weight of the total mixture, and preferably should be close to 1%.

Aluminum silicate, which may be in mineral form, such as mullite, is included as a refractory material and as a friction supporter. A small amount, from 1 to 5% of a metal carbide, such as silicon carbide, is also included in the composition.

There are also included in the composition as dry lubricant ingredients such materials as graphite or molybdenum disulfide. Finally, there are also included soldering metals or alloys, such as tin.

The following example illustrates the practice of the invention and the preparation of the preferred composition of the invention:

Example 1

A mixture was prepared of the following:

| | Percent by weight |
|---|---|
| Iron powder | 50 |
| Copper powder | 30 |
| Copper sulfide | 2 |
| Aluminum silicate | 5 |
| Silicon carbide | 3 |
| Graphite | 7 |
| Tin | 3 |

The particle size of the iron powder was less than 0.15 mm. The particle size of the copper powder was less than 0.06 mm. The mixture was pressed at a pressure of 2 ton/cm.$^2$ in a mold to form a green compact, and the compact was then sintered at a temperature of 830 ±10° C. for a period of ¾ hour to form a body having a matrix of iron with particles of the other ingredients distributed therein.

Other examples of compositions for practicing the invention are the following:

*Examples*

| | II | III | IV | V |
|---|---|---|---|---|
| Fe | 40 | 45 | 55 | 60 |
| Cu | 35 | 33 | 28 | 25 |
| CuS | 5 | | | 1 |
| NiS | | 3 | | |
| FeS | | | 2 | |
| (Al$_2$O$_3$)$_3$·(SiO$_2$)$_2$ | 9 | 6 | 4 | 2 |
| SiC | 1 | 5 | | |
| B C | | | 4 | 2 |
| C | 4 | 3 | 2 | 5 |
| MoS$_2$ | | | 2 | |
| ZnS | | 1 | | 3 |
| Sn | 6 | 4 | 3 | 2 |

Figure 2:
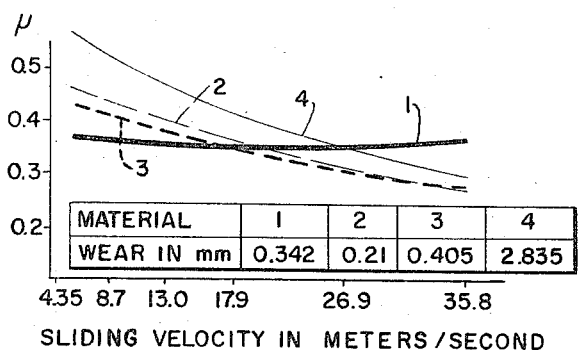
Figure 3:
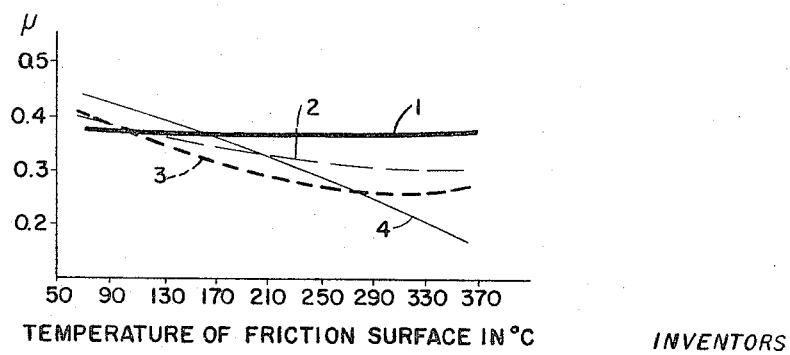

In the accompanying drawing, FIGURES 1, 2 and 3 are graphs showing the coefficient of friction, /μ, as a function of the load per unit area in kilopounds/cm.$^2$, the sliding velocity in meters/second, and the temperature of the friction surface in ° C., respectively, for each of four materials 1, 2, 3, 4, the mating material of the friction couple in each case being a steel with a low phosphor and sulfur content and containing 0.6% C.; this mating material was the material known in Germany as CK 60, untempered, which has a phosphor content of 0.035% and is similar to the material known in the United States as SAE 1060, whose phosphor content is 0.04%. The material 1 was the material described in Example 1; materials 2, 3 and 4 and the test results pertaining thereto will be described below.

A test specimen of the material 1 was sintered at 850° C., and its frictional characteristics were measured on an intertial dynamometer for friction segments. The inertia dynamometer was so arranged that two specimens were pressed against the periphery of rotating disc having a diameter of approximately 400 millimeters. The actual testing was carried out by means of so-called full stop braking, i.e., the disc was brought up to a predetermined rotational speed, by means of an electric motor drive, after which the two specimens were hydraulically pressed against the disc from both sides. The hydraulic pressing means were in the nature of a so-called tongue or clamp which was carried by a lever which bore against a pressure gage. In this way, the braking moment and hence the friction could be measured accurately.

As explained above, the mating material was untempered CK 60, comparable to SAE 1060.

FIGURES 1, 2 and 3 also show the characteristics of material 2, this being a comparable metallic friction material on a bronze base, and having the following composition:

| | Percent by weight |
|---|---|
| Cu | 69 |
| Pb | 8 |
| Sn | 5 |
| Graphite | 8.5 |
| SiO$_2$ | 4 |
| MoS$_2$ | 5.5 |

It will be noted that the friction characteristics and the wear for material 2 (the wear being the decrease in thickness of the friction layer per unit) being similar to that of material 1, the costs of the raw materials for the material 1 are about 50% lower than the costs of the raw materials for the material 2.

Material 3 is a common sintered friction material, consisting essentially of sintered iron powder with very high addition of graphite, approximately 20% by weight. It will be noted that the wear of the material—a point which is of great importance—is significantly higher than in the case of material 1. Furthermore, the manufacturing costs for making the material 3 are very high and require sintering temperatures of between 1100° and 1150° C.; this requires special and expensive sintering facilities.

Material 4 is composed of:

| | Percent by weight |
|---|---|
| Fe | 50 |
| Cu | 15 |
| $Fe_2O_3$ | 14 |
| $BaSO_4$ | 6 |
| $SiO_2$ | 3 |
| Asbestos | 3 |
| Graphite | 9 |

It will be noted that material 4 exhibits a very marked dependence on the sliding velocity and on the temperature (thermal fading). The exceedingly high wear eliminates the feasibility of putting this material to any practical use.

It will be seen from the above comparison of the material 1 with the materials 2, 3 and 4 that the material in accordance with the present invention has a number of advantages:

(1) The material has a well balanced composition.
(2) The material has very good frictional characteristics and low wear.
(3) The material can be easily machined.
(4) The material can be manufactured at low cost.

It will be understood that the above description of the present invention is susceptible to various modifications, changes, and adaptations, and the same are intended to be comprehended within the meaning and range of equivalents of the appended claims.

What is claimed is:

1. A composition adapted for the preparation of a sintered friction material consisting essentially of:

| | Percent by weight |
|---|---|
| Iron power | 40–60 |
| Copper powder | 25–35 |
| Metal sulfide | 1–5 |
| Aluminum silicate | 3–10 |
| Metal carbide | 1–5 |
| Dry lubricants | 5–10 |
| Soldering metal melting between 100° and 500° C. | 2–6 |

2. A composition adapted for the preparation of a sintered friction material consisting essentially of:

| | Percent by weight |
|---|---|
| Iron powder | 50 |
| Copper powder | 30 |
| Copper sulfide | 2 |
| Aluminum silicate | 5 |
| Silicon carbide | 3 |
| Graphite | 7 |
| Tin | 3 |

3. A sintered friction material consisting essentially of:

| | Percent by weight |
|---|---|
| Iron powder | 40–60 |
| Copper powder | 25–35 |
| Metal sulfide | 1–5 |
| Aluminum silicate | 3–10 |
| Metal Carbide | 1–5 |
| Dry lubricants | 5–10 |
| Soldering metal melting between 100° and 500° C. | 2–6 | said sintered material comprising an iron matrix having the remaining ingredients distributed in the body thereof.

4. A sintered friction material consisting essentially of:

| | Percent by weight |
|---|---|
| Iron powder | 50 |
| Copper powder | 30 |
| Copper sulfide | 2 |
| Aluminum silicate | 5 |
| Silicon carbide | 3 |
| Graphite | 7 |
| Tin | 3 | said sintered material comprising an iron matrix having the remaining ingredients distributed in the body thereof.

References Cited by the Examiner

UNITED STATES PATENTS

| 2,229,330 | 1/1941 | Langhammer et al. | 29—182.5 |
| 2,784,105 | 3/1957 | Stedman et al. | 29—182.5 |
| 2,899,740 | 8/1959 | Cox | 29—182.8 |
| 2,966,737 | 1/1961 | Spokes et al. | 29—182.5 |

CARL D. QUARFORTH, *Primary Examiner.*

R. L. GRUDZIECKI, *Assistant Examiner.*